(No Model.)
P. RABBIDGE.
CONNECTION FOR TELEPHONE APPARATUS.
No. 558,106. Patented Apr. 14, 1896.
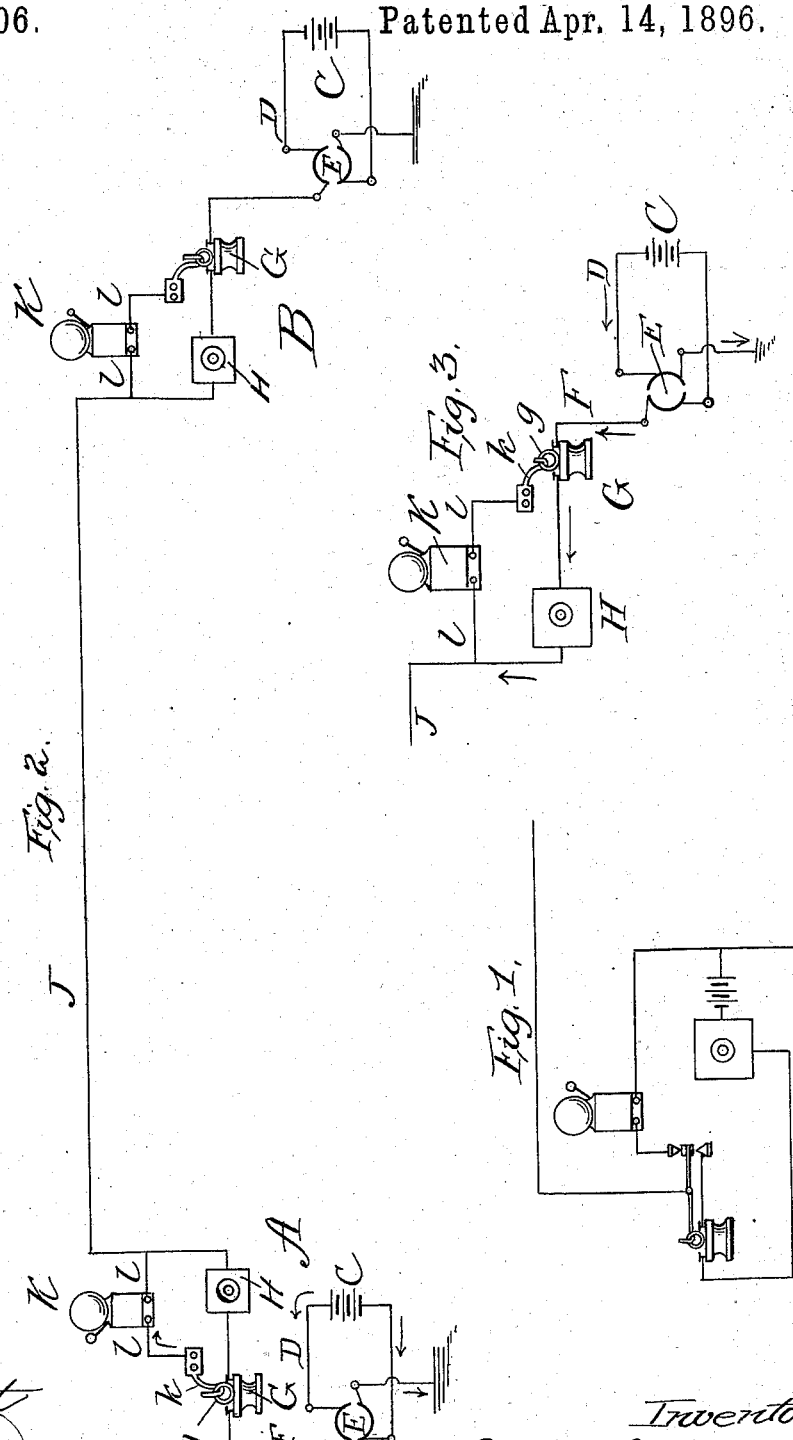

UNITED STATES PATENT OFFICE.

PARNELL RABBIDGE, OF SYDNEY, NEW SOUTH WALES.

CONNECTION FOR TELEPHONE APPARATUS.

SPECIFICATION forming part of Letters Patent No. 558,106, dated April 14, 1896.

Application filed May 20, 1895. Serial No. 549,909. (No model.)

*To all whom it may concern:*

Be it known that I, PARNELL RABBIDGE, a subject of the Queen of Great Britain and Ireland, and a resident of Sydney, county of Cumberland, and Colony of New South Wales, have invented a certain new and useful Improved Mode of Connecting the Parts of a Telephone Apparatus, of which the following is a specification.

The telephonic apparatus usually consists of five parts—namely, the call, transmitter, receiver, battery, and switching appliances whereby the necessary parts are switched in and out of circuit, as required. Up to the present time this switching appliance has been usually constructed so as to automatically switch the call apparatus into the circuit while the battery, transmitter, and receiver are switched out of circuit when the receiver is hung on a hook that operates the switch.

The object of this invention is, first, to dispense with the mechanical automatic switch appliance, and to arrange the circuit so that the transmitter, receiver, and battery shall remain constantly in the line-circuit; secondly, to arrange the call-circuit whereby two trembling bells (one at each station) can be used and made to act at the same time.

To secure the first object of my invention, the batteries at each station are connected to a simple pole-reverser or commutator, whereby the poles of either battery can be reversed when it is required to use the telephone. By this means the two batteries are arranged so as to oppose each other when the telephones are not in use and are brought into action by reversing the poles at one station only in such a manner that when the switch is operated at one station the two batteries are brought into action in series to each other. To secure the second object, I connect my bell or call in a parallel or shunt circuit to the transmitter and receiver, with one end of the call-circuit connected permanently, while the other end may be broken automatically, so as to cut the bell out of circuit, as required. By this means two trembling bells may be made to act at the same time, one at each station. When the battery is switched into circuit, the calls at both stations will continue to ring until the operator at either end shall automatically cut the call out of circuit—as, for instance, by lifting the receiver to his ear—when both the calls immediately cease to ring. Thus the ceasing of the ring at A station will show that some preson is attending at B station.

In the accompanying drawings, Figure 1 shows the old style or system as used at the present time. Fig. 2 shows my invention applied to both ends of a line, while Fig. 3 shows the arrangement at one end only, on a larger scale.

In Fig. 1 the receiver is shown hung on the end of the lever which constitutes the mechanical switch above referred to, the position being that the receiver, transmitter, and battery are switched out of circuit while the bell is in circuit.

In the improved arrangement shown in Fig. 2 two stations A and B are shown, the arrangement of the apparatus at the two stations being identical. The current will pass from the battery C through the conductor D, through the commutator or pole-reverser E, through the conductor F to the ring $g$ of the receiver G, and from thence through the transmitter H to line J. When the ring $g$ is hung on the hook $k$ of the call K, so as to form metallic contact therewith, a portion of the current will pass by shunt-circuit $l\,l$ through the call K to line J, thus causing the bell or call to sound.

In Fig. 2 the commutators or pole-reversers E are shown in the same position at both ends, and consequently the batteries C are in opposition and no current will flow; but if the commutator E at the station B be placed in the position shown in Fig. 3 the batteries will be brought into action in series to each other, and the bells or calls at both the stations A and B will be caused to sound or ring and will continue so to ring until one or other of the receivers G is removed from its hook, when both the calls will cease or greatly diminish in intensity, thus indicating that some person is in attendance at the telephone. This diminution of the intensity of both bells is due to the fact that when the receiver is lifted from the hook $k$ at the receiving-station the only path for the current will be through the receiver instead of through both the receiver and the call-shunt. This will offer greater resistance to the current, and consequently it will become so weak as to diminish the intensity of the bell at the calling-station, that at the receiving-station being cut out; and this weakening of the current may be such as to cause the bell at the calling-station to cease ringing entirely.

Having thus described my invention, what I claim as new, and desire to secure by Letters Patent of the United States, is—

1. A telephone apparatus comprising two conductors one of which is permanent, the transmitters and receivers arranged in the closed circuit formed by said permanent conductor, the other conductor being arranged in shunt with the receiver and transmitter, and arranged to be broken, the said receivers being arranged to make and break the shunt-circuit, the call-bells in said shunt-conductors and the pole-changers in the permanent circuit, substantially as described.

2. In combination the receivers and transmitters, the main circuit, means for controlling the current therein, the call-bells arranged in shunt with the main line, the said receivers controlling the making and breaking of said shunt-circuit, said call-bells at both stations being controlled by lifting the receiver at the receiving-station from its hook, the transmitter and the receiver at the sending-station remaining in circuit during the signaling, substantially as described.

3. In telephone apparatus, in combination, a battery at each end of the line, a commutator or pole-reverser at each end of the line whereby the batteries may be brought into action in series to each other, a receiver and transmitter at each end of the line, a bell or call that is placed in a shunt-circuit to the receiver and transmitter and means for automatically bringing the bell or call into the circuit from the batteries to line, as herein set forth.

In witness whereof I have hereunto set my hand in presence of two witnesses.

PARNELL RABBIDGE.

Witnesses:
MANFIELD NEWTON,
JAS. T. HUNTER.